Feb. 3, 1959  L. R. CHAPMAN, JR., ET AL  2,872,674
DRIFT CALIBRATION
Filed June 22, 1956  4 Sheets-Sheet 1

INVENTOR.
LESLIE R. CHAPMAN JR.
JOHN W. GRAY
CARL H. JACOBSON
BY
ATTORNEY

United States Patent Office 2,872,674
Patented Feb. 3, 1959

2,872,674
DRIFT CALIBRATION

Leslie R. Chapman, Jr., Thornwood, and John W. Gray and Carl H. Jacobson, Pleasantville, N. Y., assignors to General Precision Laboratory Incorporated, a corporation of New York Application June 22, 1956, Serial No. 593,161

14 Claims. (Cl. 343—17.7)

The subject of aerial navigation by means of ground speed and drift determined by Doppler radar apparatus has received considerable attention in the last few years. In the present state of the art, the drift angle is usually determined by directing two beams of microwave energy from an aircraft toward the earth. The beams are fixed relative to each other and to a horizontal platform and are directed to the right and to the left of the ground track respectively. The energy reflected from the earth by the two beams is received separately and any difference in received frequencies is used as an error signal to servo the antenna assembly about a vertical axis to reduce the difference to a null. The axis of the antenna assembly is in this fashion kept parallel to the ground track and the angle between this axis and the longitudinal axis of the aircraft is the drift angle.

In order to take advantage of the high accuracy obtainable with apparatus as above described, it is necessary that the system be carefully calibrated. The indicated drift angle is the angle between the mechanical axis of the antenna and the longitudinal axis of the aircraft and one degree change in antenna position is indicated as one degree change in drift angle. Consequently, the problem is not a scale factor problem but a problem of zero set; i. e., making zero true drift angle and zero indicated drift angle correspond.

Indicated drift angle may differ from true drift angle for reasons which may conveniently be considered as being instantaneous effects and long time effects. The instantaneous indicated drift angle may be in error for two reasons. First, the inherent fluctuations in Doppler frequency measurement result in corresponding fluctuations in Doppler drift angle determination. Second, the drift servomechanism does not have high enough frequency response to follow all components in the actual change in drift angle of the aircraft. It is therefore necessary to obtain an average of indicated drift angle over several miles of travel before the required accuracy can be achieved.

The average indicated drift angle, taken over a comparatively long time, will be in error if the mechanical and electrical axes of the antenna do not coincide. If, for example, the beam propagation angles of the right and left antennas are not equal, the antenna position corresponding to equal frequencies will be one in which the mechanical axis is rotated slightly from the ground track.

Various schemes for calibrating Doppler system antennas on the ground have been proposed. These schemes include the use of a merry-go-round type of device, use of fixed antennas and a travelling belt or "flying carpet" target, mounting the system on a cable or beam suspension, mounting the system to receive an echo from a waterfall or river, and mounting the system on a truck. To date, none of these systems has been found adequate.

Various "in flight" calibration procedures have also been tested. The most widely used procedure was one in which the aircraft was flown back and forth over a straight test course and the indicated drift angles for the two directions averaged. The drift calibration angle was determined as one-half the algebraic sum of these averages. This procedure required a large number of observations by the operator and relied for its accuracy on several assumptions of questionable validity; namely, constant wind, constant aircraft yaw angle, and a constant ground track.

It appears unlikely that accuracies much better than $\pm 0.2°$ are attainable with this method. Since it is desired to determine drift angle to within $0.1°$, the zero set calibration should be significantly better, preferably on the order of $0.05°$.

It is an object of this invention to device a method for calibrating the drift angle zero set of a Doppler navigation system with a high degree of accuracy.

Another object of the invention is to provide a method for calibrating the drift angle zero set of a Doppler navigation system which is independent of wind and aircraft yaw.

Another object of the invention is to measure the angle between the true and indicated drift angles.

In accordance with one embodiment of the invention, an aircraft containing the equipment under test is flown over a long straight test course, visible from the air, such as a straight stretch of railroad track. An accurate heading reference, from a directional gyroscope, for example, is maintained on the aircraft and arranged to give a continuous indication of the angle $\theta$ between its reference direction and the longitudinal axis of the aircraft. This angle $\theta$ is continuously subtracted from the drift angle, $\alpha$, as indicated by the system under test, and the difference is integrated with respect to time during the flight. Division by time yields the average value of $\theta - \alpha$. Two simultaneous photographs, one showing the angle between the heading reference and the aircraft axis and the other showing the angle between the aircraft axis and the railroad track, allow the determination of the angle between the heading reference and the railroad track. The difference between this angle and the average value of $\theta - \alpha$ is the drift calibration angle.

For a clearer understanding of the invention, reference may be made to the accompanying drawing, in which.

Figure 1:
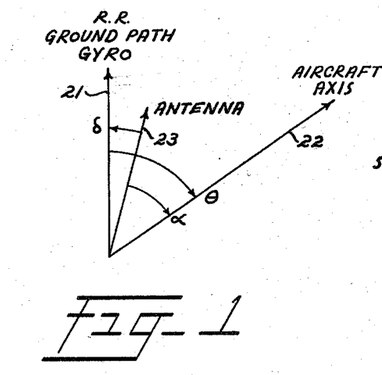
Figures 1, 2 and 3 are diagrams useful in explaining one embodiment of the invention.

There are a number of stretches of railroad track in the country which follow a straight line for twenty-five or fifty miles. Such a railroad track is useful, although not essential, to the invention. One course, which has been used successfully, is a long straight stretch having ties painted white at selected distances throughout its length. Let us suppose that we have selected such a stretch of railroad track, and let us further suppose that it were possible to fly an aircraft precisely over the track so that the ground path of the aircraft followed the railroad. The longitudinal axis of the aircraft would be displaced from the ground track by an angle $\theta$, which angle would vary continuously, due to changes in wind and yaw angle bias, as the aircraft was flown over the railroad. In Fig. 1, 21 represents the direction of the ground path of the aircraft which, for the time being, will be assumed to coincide with the railroad track. 22 represents the direction of the longitudinal axis of the aircraft at some particular instant of time making an angle $\theta$ with the railroad track. The direction of the mechanical axis of the antenna is shown at 23, making an angle $\alpha$ with the aircraft axis. If the navigational system were perfect, the axis of the antenna would coincide with the direction of the ground path, and angle $\alpha$ would equal angle $\theta$. However, as shown in Fig. 1, the antenna makes an angle $\delta$ with the ground path and this angle $\delta$ represents the error, or drift calibration angle.

Today's high quality directional gyroscopes are capable of providing very accurate heading information. Let us make the further supposition that it were possible to align the spin axis of a directional gyroscope with the railroad track, as shown in Fig. 1. Then the output of the gyroscope would be the angle $\theta$ which, in this case, would be the true drift angle. If the angles are defined as shown in Fig. 1, that is, $\alpha$ is measured from the antenna to the aircraft axis, $\theta$ is measured from the gyroscope spin axis to the aircraft axis, and $\delta$ is measured from the antenna to the ground path, and if we further specify that clockwise angles shall be positive, then it can be seen from Fig. 1 that $\delta = -(\theta - \alpha)$. As previously pointed out, $\alpha$ has inherent short time errors so that $\delta$ can be determined accurately only by considering average values of $\alpha$ taken over a comparatively long time. This may be done by continuously subtracting $\alpha$ from $\theta$, integrating the result with respect to time, and dividing by the elapsed time. Then $$\delta = -\frac{1}{T}\int(\theta - \alpha)dt$$

The above described procedure, although somewhat simplified, is the basis of the method of the present invention. Both $\theta$ and $\alpha$ are measured with respect to the longitudinal axis of the aircraft so that all changes in the direction of this axis affect $\theta$ and $\alpha$ equally. Thus it is seen that the determination of the drift calibration angle $\delta$ is independent of wind and yaw angle.

Figure 2:
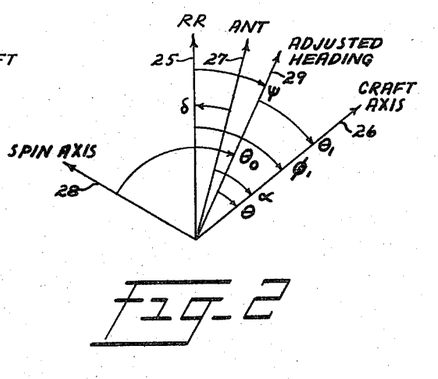

It is impossible to align the gyroscope spin axis with the railroad track with sufficient accuracy; however, it is possible to determine the angle between the spin axis and the railroad track by means of photographs. Referring now to Fig. 2, the direction of the railroad track is shown at 25, the axis of the aircraft at 26, and the antenna axis at 27. The spin axis of the gyroscope may be in any direction, as shown, for example, at 28. It would be possible to subtract the indicated drift angle $\alpha$ from the angle between the gyroscope spin axis and the aircraft axis and integrate the result but in order to simplify the instrumentation it is preferred to make the angle $\theta$ approximately equal to the angle $\alpha$. This may be done by providing a clutch between the gyroscope output shaft and the adjusted heading shaft, indicated at 29, and using the angle indicated by the adjusted heading shaft for computations. The aircraft is flown over the beginning of the test course and the indicated drift angle $\alpha$ is noted. The adjusted heading shaft is then rotated with respect to the spin axis through an angle $\theta_0$ sufficient to make the angle $\theta$ between this shaft and the aircraft axis approximately equal to the indicated drift angle $\alpha$. If $\alpha$ be continuously subtracted from $\theta$, integrated, and divided by elapsed time, the result is the drift calibration angle $\delta$ modified by the angle $\psi$ between the railroad track and the adjusted heading shaft. This angle $\psi$ may be determined photographically. At the beginning of the test run, two photographs are taken simultaneously. The first is taken of the ground by an aerial camera the fiducial marks of which are aligned with the longitudinal axis of the aircraft and from which the instantaneous angle $\phi_1$ between the railroad and the aircraft axis can be measured. The second is taken within the aircraft and shows the instantaneous angle $\theta_1$ between the adjusted heading shaft and the aircraft axis. The difference between these angles, $\phi_1 - \theta_1$ is the angle $\psi$ between the railroad and the adjusted heading shaft. If the angles are measured as shown in the drawing and if clockwise angles are regarded as positive, it can be seen that $$\delta = -\frac{1}{T}\int(\theta - \alpha)dt - (\phi_1 - \theta_1)$$

It can be seen that this determination of $\delta$ is also independent of wind. $\theta$ and $\alpha$ are both measured with respect to the aircraft axis so that a change in direction of this axis will affect both equally leaving the difference, $\theta - \alpha$, unchanged. Similarly, $\phi_1 - \theta_1$ is unaffected by wind and yaw angle.

The determination of the drift calibration angle by the above procedure assumes first, that the gyroscope does not drift during the run, and second, that the ground path of the aircraft coincides with the railroad track. These two assumptions are not completely true and more accurate results can be obtained if these sources of error are considered. The gyroscope should, of course, be compensated for earth rate and rate of change of longitude and such compensation may be effected by techniques well known to those skilled in the art. The error due to gyroscope drift during the run can be eliminated by taking two sets of photographs, one set at the beginning of the run to obtain $\phi_1$ and $\theta_1$, as above described, and another set at the end of the run to obtain $\phi_2$ and $\theta_2$, and using the average of the values, $\bar{\phi}$ and $\bar{\theta}$, for computations.

Figures 3, 7:
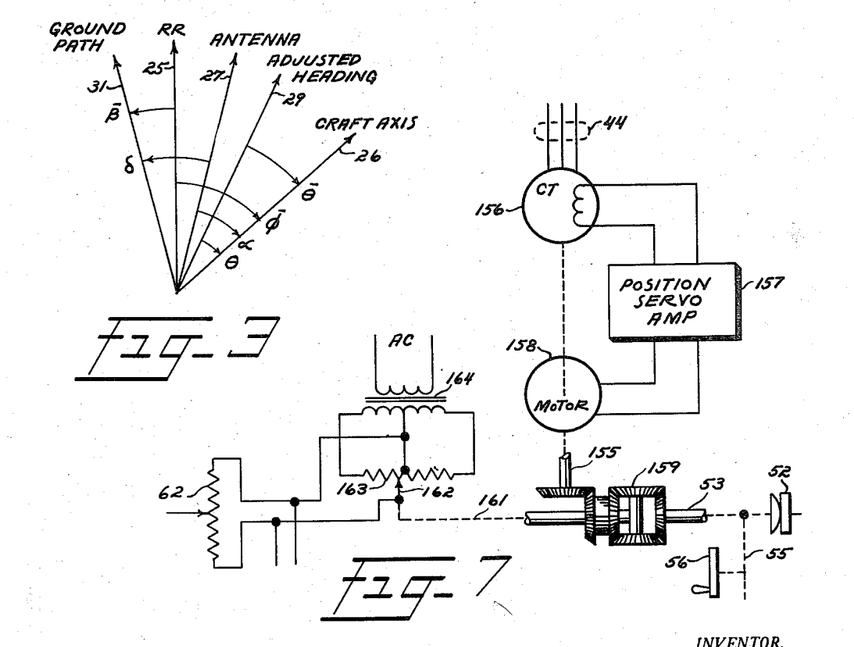
Figure 7 is a block diagram of a modification of the apparatus shown in Figure 4.

In actual flight, the ground path of the aircraft does not coincide with the railroad track, but may weave back and forth, the tangent to the path making an instantaneous angle $\beta$ with the railroad track. Fig. 3 is a diagram similar to Fig. 2 but showing, in addition, the direction of the average ground path 31 making an average angle $\bar{\beta}$ with the railroad. It can be shown mathematically that, for small values of $\beta$, the average value, $\bar{\beta}$, depends on the position of the aircraft at the beginning and end of the run and is independent of the aircraft position at intermediate points. If the test is started and finished at moments when the aircraft is precisely over the railroad, $\bar{\beta}$ is zero and no correction is required. It has been found that it is not practical to start and finish each run with the aircraft precisely over the railroad track. In such cases, correction for $\bar{\beta}$ can be made quite easily. It can be shown that, for small angles of $\beta$, $$\bar{\beta} = \frac{y_f - y_i}{l}$$

where $y_i$ and $y_f$ represent the initial and final values of ground distance between the true aircraft position and the railroad, and $l$ is the length of the test course. $y_i$ and $y_f$ may be scaled from the aerial photographs taken to determine $\phi_1$ and $\phi_2$.

Referring to Fig. 3, and continuing to regard clockwise angles as positive, it can be seen that $$\delta = -\frac{1}{T}\int(\theta - \alpha)dt - (\bar{\phi} - \bar{\theta}) + \bar{\beta}$$

Figure 4:
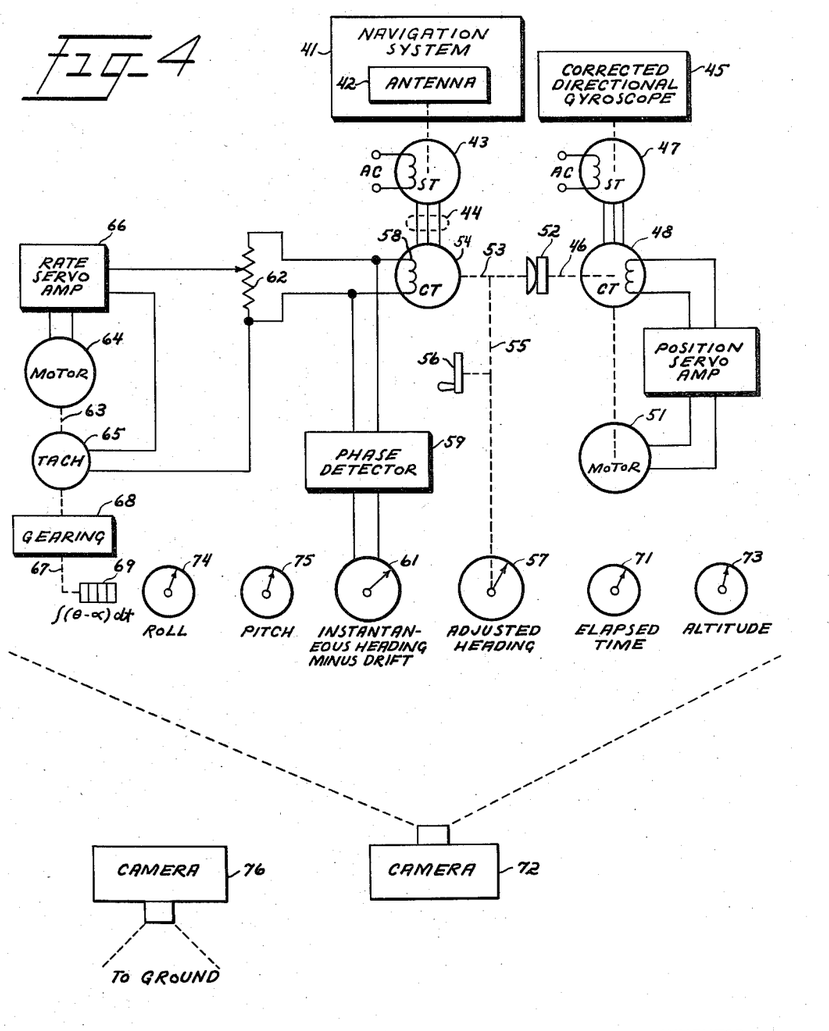
Figure 4 is a block diagram of one form of apparatus for assisting in the practice of the invention.

Although certain portions of the calibration method described above must necessarily remain manual operations, apparatus can be devised to assist the operator and to perform some of the steps. In Fig. 4, for example, there is illustrated, in block diagram form, an arrangement which has been found to be adequate for calibrating the system with the desired accuracy. There is shown a navigating system 41 which includes an antenna system 42 and the necessary transmitters, receivers, servomechanisms and other items to maintain the axis of the antenna oriented so that the frequency of the energy reflected from the earth by the two beams is equal. The navigation system 41 may, for example, be similar to that described in the copending application of Berger and Tull, S. N. 49,926, filed September 18, 1948, for Course and Speed Indicating System, or to that described in the copending application of Berger, Tull and Gray, S. N. 249,472, filed October 3, 1951, for Course and Speed Indicating System.

A synchro transmitter 43 is mechanically connected to the antenna to convert the physical angular position of the antenna axis to three wire electrical information on conductors 44 denoting the same angular position. A directional gyroscope 45 is provided and the angle between its spin axis and the longitudinal axis of the aircraft is reproduced on the shaft 46 by means of the two synchros 47 and 48, the position servo amplifier 49 and the motor 51. The shaft 46 is connected to one plate of the slip clutch 52, the other plate of which is connected by means of a shaft 53 to the rotor of a synchro control transformer 54. An auxiliary shaft 55, which may be an extension of or geared to the shaft 53, is provided with a handwheel 56 so that the shaft 53 may be rotated with respect to the shaft 46. The angular position of the shaft 53 is displayed on the adjusted heading indicator 57.

It will be recalled that the calibration according to the invention requires the determination of the angular difference between the antenna and the adjusted heading shaft 53. This comparison is made by connecting the the conductors 44 to the stator of the control transformer 54 so that an angular difference between the antenna and the adjusted heading shaft 53 will cause an alternating current signal to appear on the rotor coil 58 of the control transformer 54. If the angular difference should vary through 360°, the amplitude of the potential on the rotor coil 58 would, of course, vary sinusoidally. However, if the angular difference does not exceed plus or minus 4°, the potential of coil 58 will vary substantially linearly with the angular difference. This signal is an alternating current signal, the amplitude of which is proportional to the magnitude of the angular difference and the phase of which indicates the sense of the difference. The angular difference may be displayed conveniently by converting the alternating current signal of reversible phase to a direct current signal of reversible polarity by means of a phase detector 59, the output of which operates a direct current indicator 61.

The potential of winding 58 is also applied to a potentiometer 62 so that a suitable portion of the output can be used to cause a shaft 63 to be rotated at an angular velocity proportional to the potential on coil 58. A motor 64 is connected to the shaft 63 which also carries a tachometer generator 65, the output of which is an alternating current having an amplitude proportional to its speed of rotation. The output of the tachometer 65 is connected in series with the signal from the potentiometer 62 and the difference is applied as an error signal to the input of a rate servo amplifier 66 which drives the motor 64 so as to maintain the speed of shaft 63 proportional to the angular difference between the antenna and the adjusted heading shaft 53.

The shaft 63 rotates the shaft 67 through suitable reduction gearing 68 and the shaft 67 operates a mechanical revolution counter 69. The revolutions so counted thus represent the integral, with respect to time, of the angular difference between the antenna axis and the adjusted heading shaft. A clock 71 is also provided so that the elapsed time during the test run may be determined. A camera 72 is arranged to photograph the revolution counter 69, the heading minus drift indicator 61, the adjusted heading indicator 57, the clock 71, an altimeter 73, a roll indicator 74 and a pitch indicator 75. Another camera 76 having fiducial marks accurately aligned with the aircraft longitudinal axis is arranged to photograph the ground in order to determine the angle between the railroad track and the axis of the aircraft and also the instantaneous ground position of the aircraft.

In operation, the aircraft having instruments as above described is flown toward the beginning of the test course. The angle indicated by the meter 61 is noted and the handwheel 56 is used to adjust the shaft 53 until this angle is approximately zero. As the aircraft flies over the beginning of the course photographs are taken simultaneously with cameras 72 and 76. The aircraft is flown as nearly as possible directly over the railroad track by an operator who looks at the track through an optical drift sight and who adjusts a trim control on the auto-pilot accordingly. He endeavors to hold the aircraft directly over the railroad track and to make only small corrections in the heading at infrequent intervals. At the end of the course, another set of photographs is made with cameras 72 and 76. When the films are developed, the drift calibration angle may be determined as explained in connection with Fig. 3.

Some errors may arise in the determination of the angle between the aircraft axis and the railroad track by means of the photographs taken by camera 76, but these errors can be minimized by taking several photographs, say five or ten, at both the beginning and the end of the run and using the average of the angles indicated thereby. Correction for roll and pitch may also be applied in the interpretation of the photographs taken by the camera 76.

Figure 5:
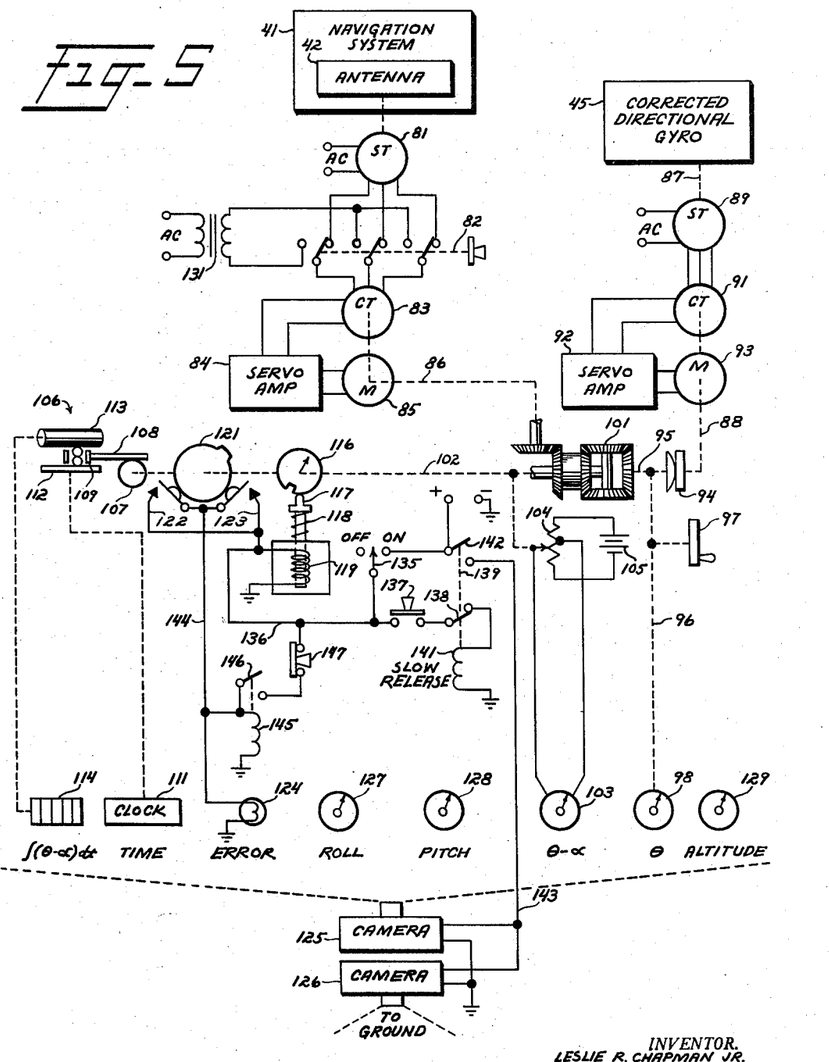
Figure 5 is a block diagram of another form of apparatus for assisting in the practice of the invention.

Figure 5 shows another form which apparatus may take to assist in performing the invention. There is shown the navigation system 41, together with its antenna 42, which constitutes the device under test. The shaft of the antenna is connected to a synchro transmitter 81 in order to convert the shaft position to three-wire information. The three conductors from the synchro transmitter 81 are connected through a three-pole double throw switch 82 to a control transformer 83 which cooperates with a servoamplifier 84 and motor 85 to repeat the antenna position as the position of a shaft 86.

The directional gyroscope 45 has the position of its shaft 87 repeated as the position of a shaft 88 by means of a conventional arrangement comprising a synchro transmitter 89, a control transformer 91, a servoamplifier 92 and a motor 93. The shaft 88 is connected through a slip clutch 94 to the shaft 95. An auxiliary shaft 96 which may be an extension of or geared to the shaft 95 is provided with a handwheel 97 so that the shaft 95 may be rotated with respect to the shaft 88. The angular position of the shaft 95 is displayed by means of an indicator 98 connected to the shaft 96.

The shaft 95 represents the adjusted heading angle θ while the position of the shaft 86 represents the drift angle α as indicated by the system under test. These two shaft positions are subtracted by means of a mechanical differential 101 and the difference appears as the position of a shaft 102. The position of the shaft 102 is displayed on an indicator 103 which may be a direct current instrument operated by the potential between the midpoint and the slider of a potentiometer 104 the extremities of which are connected to a source of direct current, schematically indicated by the battery 105, and the slider of which is positioned by the shaft 102.

The shaft 102 operates a mechanical ball and disc integrator indicated generally by the reference character 106. The shaft 102 operates a pinion 107 which cooperates with a rack 108 to position the ball carriage 109. A clock 111 rotates disk 112 at a constant speed so that the angular position of the cylinder 113 represents the time integral of the deviation of shaft 102 from its reference position or, stated mathematically, the accumulated revolutions of cylinder 113 are equal to $\int(\theta-\alpha)\,dt$ and is displayed on a revolution counter 114.

The shaft 102 also carries a wheel 116 having a notch in its periphery. A plunger 117 is biased by a spring 118 against the edge of the wheel and when the wheel is in its reference, or zero position, the plunger will engage the notch and hold the shaft 102 stationary. The plunger may be withdrawn from the notch by energizing a solenoid 119.

The shaft 102 also carries a cam 121 which is arranged to operate one or the other of limit switches 122 and 123 when the shaft 102 deviates a predetermined amount from its reference position. Operation of either limit switch illuminates a lamp 124 as will be more fully explained.

As in the case of the apparatus described in connection with Fig. 4, there are provided two cameras 125 and 126. Camera 126 is arranged to photograph the terrain beneath the aircraft while camera 125 is arranged to photograph the revolution counter 114, the clock 111, the error signal lamp 124, a roll indicator 127, a pitch indicator 128, the difference angle indicator 103, the adjusted heading angle indicator 98 and an altimeter 129. The remainder of the apparatus of Fig. 5 will be described when the operation of the apparatus is considered.

Operation

The first step in the operation is the zero check of the apparatus. While the aircraft is on the ground, or before it has reached the test course, the switch 135 is thrown to its "on" position. This places a positive potential on the conductor 136 which energizes the solenoid 119 thereby withdrawing the plunger 117 from contact with the wheel 116. Next the zero check switch 82 is depressed, thereby connecting two terminals of the control transformer 83 together and to one terminal of the secondary of a transformer 131, the primary of which is connected to a source of alternating current. The other stator terminal is connected to the other terminal of the secondary of transformer 131. This connection causes the motor 85 to adjust the shaft 86 to a position corresponding to zero drift angle and, at the same time that the switch 82 is depressed, the handwheel 97 is adjusted until the indicator 98 reads zero also. At this time, shaft 102 will therefore be in its zero or reference position and the indicator 103 should also indicate zero. If it does not, this is an indication that the apparatus is not adjusted properly and should be checked.

If the indicator 103 does read zero, as it should, the switch 135 may be returned to its "off" position, thereby deenergizing the solenoid 119 and allowing the plunger 117 to enter the slot in the wheel 116, thereby holding the shaft 102 in its zero position. The zero check switch 82 may now be released. The adjustment of the integrator 106 should now be checked by observing the revolution counter 114 to be sure that the cylinder 113 is not rotating.

With the craft airborne and the navigation system 41 in operation, the shaft 86 will be positioned in accordance with the drift angle, $\alpha$. Since the shaft 102 is held in its zero position, the position of shaft 86 will be transmitted through the differential 101 to the shaft 95. The clutch 94 permits relative motion between shafts 88 and 95, and the indicator 98 will display the drift angle, $\alpha$, even though the gyroscope 45 may rotate the shaft 88 due to changes in heading. Referring to Fig. 2 for a moment, the above procedure amounts to adjusting $\Theta_0$ continuously so that $\Theta = \alpha$.

The aircraft is now flown toward the starting point of the course as nearly as possible on a line over the railroad track. As the starting point is approached, the switch 135 is thrown to its "on" position. This places a positive potential on conductor 136 thereby energizing the solenoid 119 and withdrawing the plunger 117 from the notch in the wheel 116. The shaft 86 will now be positioned by the apparatus under test in accordance with the measured drift angle $\alpha$ while the shaft 102 will be free to assume a position corresponding to $\Theta - \alpha$. When the aircraft flies precisely over the starting point of the course, the push-button switch 137 is momentarily depressed. This causes positive potential from conductor 136 to flow through the switch 137 and the normally closed contacts 138 of a relay 139 to the operating winding 141 of the relay 139 thereby picking up the relay. As the relay picks up, the normally closed contacts 138 open and the normally open contacts 142 close thereby placing a positive potential on the conductor 143 so as to operate the two cameras 125 and 126.

One pair of cameras which have been used successfully require a pulse of approximately 0.6 second duration for proper operation. In order to obtain this pulse, the relay 139 may be a time delay relay which remains picked up for 0.6 second after it has been deenergized.

The ball and disc integrator 106 has, of course, limits of operation. If the angle $\theta - \alpha$ which is represented by the position of shaft 102 should momentarily become too large, faulty operation would result. The cam 121, the limit switches 122 and 123, and the warning lamp 124 are provided to give notice of such faulty operation. If the instantaneous value of the angle $\theta - \alpha$ should become too large, the cam 121 will close one or the other of the limit switches 122 and 123 thereby placing the positive potential from conductor 136 on to conductor 144. This lights the lamp 124 and also energizes a relay winding 145 which seals itself in by means of a connection through the normally open contacts 146 and a normally closed push-button switch 147 to the conductor 136. Therefore, if at any time the instantaneous value of $\theta - \alpha$ becomes too large the warning lamp 124 will become lighted and will remain lighted until the relay 145 is deenergized by manual operation of the switch 147. The lamp 124 is within the field of view of camera 125 so that any data taken while the lamp 124 is lighted may be discarded.

When the aircraft reaches the end of the run the push-button switch 137 is again depressed so as to take two more photographs. After these last photographs are taken the switch 135 is returned to its "off" position. The data may be reduced and the drift calibration angle determined in exactly the same manner as previously explained.

It is usually convenient to make several calibration runs over the course in each direction during the same flight. After the first run, the indicator 103 will, in general, indicate some angle $\theta - \alpha$ different from zero. It is only necessary for the pilot to turn the aircraft in the proper direction to reduce $\theta - \alpha$ to zero, at which point the plunger 117 will enter the slot in the wheel 116 and lock the shaft 102 in its zero position. When the aircraft has completed its turn and is on course for the second run, the switch 135 is thrown to its "on" position and the second calibration run made as before.

In actual practice, the same test runs used for drift calibration are also used for ground speed calibration. A navigation system such as system 41 is usually arranged to provide ground speed information as well as drift information. Ground speed is proportional to the difference between transmitted and received frequencies and distance travelled is proportional to the integral of ground speed, or, what is the same thing, to the number of cycles of the difference frequency. The number of cycles is counted during the interval between the taking of the first and second photographs, and, since the length of the course is known, the calibration constant, in cycles per second per knot, can be computed readily.

Figure 6:
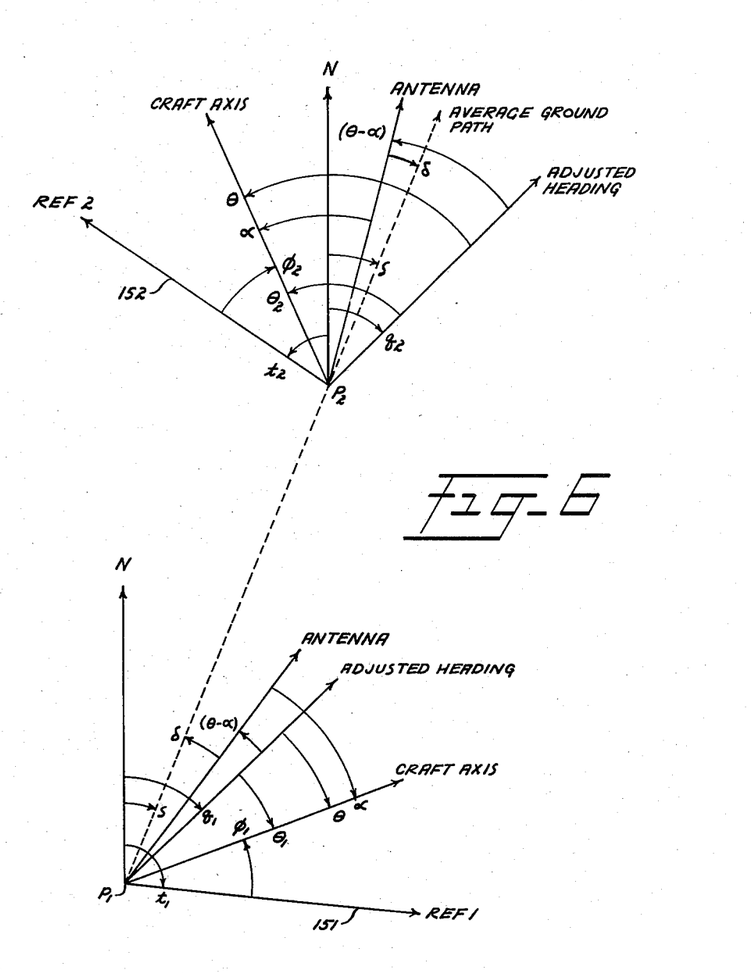
Figure 6 is a diagram useful in explaining a modified form of the invention.

Figure 6 shows how the drift calibration angle $\delta$ may be determined without the use of a continuous reference line visible from the air from the beginning to the end of the test course. In Fig. 6 the points $P_1$ and $P_2$ represent the ground positions of the starting and finishing positions of the test run. At each point there is a reference line on the ground, visible from the air, whose direction is known precisely, shown in Fig. 6 as the lines 151 and 152 respectively. These lines may, for example, be runways, whose directions may be accurately measured with respect to a stellar reference or with respect to true north. They are shown in Fig. 6 as making angles $t_1$ and $t_2$ respectively with true north.

The equipment used for a calibration run from $P_1$ to $P_2$ may be similar to that illustrated in either Fig. 4 or Fig. 5. If apparatus similar to that of Fig. 4 is used, it is preferable to replace the control transformer 54 with a mechanical differential, in order to relax the requirement for flying the aircraft in a straight line throughout the run. This modification may be made as shown in Fig. 7.

Referring now to Fig. 7, the three wire antenna position information on conductors 44 is converted to the angular position of a shaft 155 by means of a control transformer 156, a position servo amplifier 157, and a motor 158. The shaft 155 serves as one input to a mechanical differential 159 while the adjusted heading shaft 53 serves as the other input. The position of the output shaft 161 represents the angular difference between the adjusted heading shaft and the antenna. The shaft 161 adjusts the slider 162 of a potentiometer 163, the extremities of which are connected across the center tapped secondary of a transformer 164 whose primary is connected to the A.-C. power line. The center tap of the secondary is connected to the midpoint of the potentiometer 163 and to the potentiometer 62. The slider 162 is connected to the other terminal of the potentiometer 62. It is obvious that the potentiometer 62 has impressed upon it an A.-C. potential proportional to the difference in angular position of shafts 53 and 155.

Referring again to Fig. 6 the procedure followed in making a drift calibration run is similar to that described in connection with Fig. 3. It is first necessary to measure the angles $t_1$ and $t_2$ between the reference lines on the ground and some fixed reference such as true north. It is also necessary to determine the angles between true north and the line joining the points $P_1$ and $P_2$. The angle $s$ may be determined from a map showing both $P_1$ and $P_2$ or may be computed from the latitude and longitude of these points. The aircraft is flown toward $P_1$ and, in the case of the apparatus of Figs. 4 and 7, the handwheel 56 is adjusted to make the angles between shafts 155 and 53 approximately zero. If the apparatus of Fig. 5 is used, the shaft 102 may be set to its zero position as previously described. In either case, as the aircraft passes over the first reference line 151 photographs are taken with the two cameras. The flight is continued to the point $P_2$ at which point a second set of photographs is taken. The two sets of photographs, along with the angles $t_1$, $t_2$ and $s$, contain the data necessary for determining the drift calibration angle, $\delta$.

After the run has been completed, the first set of photographs will yield the angle $\phi_1$ between the first reference line and the aircraft axis and also the angle $\theta_1$ between the adjusted heading shaft and the aircraft axis. The difference between these angles, $\phi_1 - \theta_1$, is the angle between the reference line and the adjusted heading. The angle $q_1$ between true north and the adjusted heading is seen to be equal to $t_1 - (\phi_1 - \theta_1)$. If the gyroscope were perfect, this angle would remain constant throughout the test run. The gyroscope, although corrected for earth rate and rate of change of longitude, may drift during the run but the error due to drift may be eliminated by determining $q_2 = t_2 - (\phi_2 - \theta_2)$ from the second set of photographs and using the average, $$\bar{q} = \frac{q_1 + q_2}{2}$$

for calibration angle computations.

The revolution counter 69 (or 114) shows the integral of the angle between the adjusted heading reference and the antenna, or $\int (\theta - \alpha) dt$. From the readings of the counter 69 (or 114) and the clock 71 (or 111) in the two photographs, the time average, $$\frac{1}{T}\int (\theta - \alpha) dt$$

can readily be determined. It is obvious from Fig. 6 that the drift calibration angle, $\delta$, is equal to $$s - \bar{q} - \frac{1}{T}\int (\theta - \alpha) dt$$

The drift calibration procedure outlined in connection with Fig. 6 is superior, in some respects, to that outlined in connection with Fig. 3. It is unnecessary to confine operations to terrain having a clearly marked straight line on the surface of the earth. This freedom allows long test courses up to several hundred miles to be used. It is not necessary to maintain the aircraft precisely on a straight line course, since, for moderate deviations, the average ground path depends on the position of the aircraft at the beginning and end of the test and is independent of its position at intermediate points. A long test course also reduces the effects of failure of the aircraft to be precisely over the points $P_1$ and $P_2$ when the two sets of photographs are taken.

Certain apparatus has been described as useful in practicing the invention. However, the exact form of apparatus described is not essential since the invention is primarily a method. For example, the fixed reference direction could comprise magnetic or radio apparatus, although a gyroscope is preferred at present because of its simplicity and accuracy. As another example, the various angles could be visually observed and then recorded. Many other modifications will occur to those skilled in the art.

What is claimed is:

1. The method of obtaining data from which the drift calibration angle of an aerial navigation system can be computed comprising the steps of flying an aircraft containing the system under test over first and second predetermined points on the ground, averaging, over the period of the flight over said two points, the difference between a first angle, which is the angle between a fixed reference direction maintained on the aircraft and the longitudinal axis of the aircraft, and a second angle, which is the drift angle as determined by the system under test, and recording the angle between said reference direction on the aircraft and a reference line on the ground.

2. The method of claim 1 in which the reference line on the ground coincides with a line joining the two predetermined points.

3. The method of claim 1 in which the reference line on the ground makes an angle different from zero with the line joining the two predetermined points.

4. The method of obtaining data from which the drift calibration angle of an aerial navigation system can be computed comprising the steps of flying an aircraft containing the system under test over first and second predetermined points on the ground, continuously subtracting, over the period of the flight over said two points, a first angle, which is the drift angle as determined by the system under test, from a second angle, which is the angle between a fixed reference direction maintained on the aircraft and the longitudinal axis of the aircraft, integrating with respect to time the angle so subtracted, dividing the integrated angle by the time elapsing during the flight over said two points and recording the angle between said reference direction on the aircraft and a reference line on the ground.

5. The method of obtaining data from which the drift calibration angle of an aerial navigation system can be computed comprising the steps of flying an aircraft containing the system under test over first and second predetermined points on the ground, averaging, over the period of the flight over said two points, the difference between a first angle, which is the angle between a fixed reference direction maintained on the aircraft and the longitudinal axis of the aircraft, and a second angle, which is the drift angle as determined by the system under test, recording the angle between said reference direction on the aircraft and a reference line on the ground through said first point, and recording the angle between said reference direction on the aircraft and a reference line on the ground through said second point.

6. The method of obtaining data from which the drift calibration angle of an aerial navigation system can be computed comprising the steps of flying an aircraft containing the system under test over first and second predetermined points on the ground, averaging, over the period of the flight over said two points, the difference between a first angle, which is the angle between a fixed reference direction maintained on the aircraft and the longitudinal axis of the aircraft, and a second angle, which is the drift angle as determined by the system under test, recording the instantaneous angle between the reference direction on the aircraft and the longitudinal axis of the aircraft and simultaneously recording the instaneous angle between the longitudinal axis of the aircraft and a reference line on the ground.

7. The method of obtaining data from which the drift calibration angle of an aerial navigation system can be computed comprising the steps of flying an aircraft containing the system under test over first and second predetermined points on the ground, averaging, over the period of the flight over said two points, the difference between a first angle, which is the angle between a fixed reference direction maintained on the aircraft and the longitudinal axis of the aircraft and a second angle, which is the drift angle as determined by the system under test, taking first and second photographs simultaneously as the aircraft passes over said first point, the first photograph recording the instantaneous angle between the reference direction on the aircraft and the longitudinal axis of the aircraft and the second photograph recording the instantaneous angle between the longitudinal axis of the aircraft and a reference line on the ground through said first point, and taking third and fourth photographs simultaneously as the aircraft passes over said second point, the third photograph recording the instantaneous angle between the reference direction on the aircraft and the longitudinal axis of the aircraft and the fourth photograph recording the instantaneous angle between the longitudinal axis of the aircraft and a reference line on the ground through said second point.

8. The method of obtaining data from which the drift calibration angle of an aerial navigation system can be computed comprising the steps of flying an aircraft containing the system under test over first and second predetermined points on the ground, continuously subtracting, over the period of the flight over said two points, a first angle which is the drift angle as determined by the system under test from a second angle which is the angle between a fixed reference direction maintained on the aircraft and the longitudinal axis of the aircraft, integrating with respect to time the angle so subtracted, dividing the integrated angle by the time elapsing during the flight over said two points, recording the instantaneous angle between the reference direction on the aircraft and the longitudinal axis of the aircraft and simultaneously recording the instantaneous angle between the longitudinal axis of the aircraft and a reference line on the ground.

9. The method of obtaining data from which the drift calibration angle of an aerial navigation system can be computed comprising the steps of flying an aircraft containing the system under test over first and second predetermined points on the ground, continuously subtracting, over the period of the flight over said two points, a first angle which is the drift angle as determined by the system under test from a second angle which is the angle between a fixed reference direction maintained on the aircraft and the longitudinal axis of the aircraft, integrating with respect to time the angle so subtracted, dividing the integrated angle by the time elapsing during the flight over said two points, taking first and second photographs simultaneously as the aircraft passes over said first point, the first photograph recording the instantaneous angle between the reference direction on the aircraft and the longitudinal axis of the aircraft and the second photograph recording the instantaneous angle between the longitudinal axis of the aircraft and a reference line on the ground through said first point, and taking third and fourth photographs simultaneously as the aircraft passes over said second point, the third photograph recording the instantaneous angle between the reference direction on the aircraft and the longitudinal axis of the aircraft and the fourth photograph recording the instantaneous angle between the longitudinal axis of the aircraft and a reference line on the ground through said second point.

10. The method of obtaining data from which the drift calibration angle of an aerial navigation system can be computed, comprising the steps of flying an aircraft containing the system under test from a first point over a straight reference line on the ground to a second point over said reference line, averaging, over the period of the flight between said two points, the difference between a first angle, which is the angle between a fixed reference direction maintaind on the aircraft and the longitudinal axis of the aircraft, and a second angle, which is the drift angle as determined by the system under test, and recording the angle between said reference direction on the aircraft and said reference line on the ground.

11. The method of obtaining data from which the drift calibration angle of an aerial navigation system can be computed comprising, the steps of flying an aircraft containing the system under test from a point over a first reference line on the ground having a known direction to a point over a second reference line on the ground having a known direction, averaging, over the period of the flight between said two points, the difference between a first angle, which is the angle between a fixed reference direction maintained on the aircraft and the longitudinal axis of the aircraft, and a second angle, which is the drift angle as determined by the system under test, recording the angles between said fixed reference direction and each of said ground reference lines, and measuring the direction of a line joining said points.

12. The method of determining the error in the average drift angle measured by an aerial navigation system comprising, the steps of selecting a straight reference line on the ground visible from the air, flying an aircraft containing the system under test along a path substantially over said reference line, recording the values of first and second angles at the moment the aircraft passes over the beginning of said reference line, the first angle being that between a fixed reference direction maintained on the aircraft and the longitudinal axis of the aircraft and the second angle being that between said reference line and the longitudinal axis of the aircraft, continuously subtracting the varying drift angle indicated by the system under test from the varying angle between said fixed reference direction and the longitudinal axis of the aircraft, integrating with respect to time the angle so subtracted as the aircraft is flown over said reference line, recording the values of third and fourth angles at the moment the aircraft passes over the end of said reference line, the third angle being that between the fixed reference direction maintained on the aircraft and the longitudinal axis of the aircraft and the fourth angle being that between said reference line and the longitudinal axis of the aircraft, recording the time elapsed during the flight from the beginning to the end of said reference line, combining the first, second, third and fourth angles to obtain the average angle between reference line on the ground and the fixed reference direction on the aircraft, dividing the integrated angle by elapsed time and subtracting the result from said average angle to obtain the error.

13. The method of determining the error in the average drift angle measured by an aerial navigation system comprising the steps of selecting a straight reference line on the ground visible from the air, measuring the length of said reference line, flying an aircraft containing the system under test along a path substantially over said reference line, taking first and second photographs simultaneously as the aircraft passes substantially over the beginning of said reference line, the first photograph being taken within the aircraft and showing the angle between a fixed reference direction maintained on the aircraft and the longitudinal axis of the aircraft the second photograph being an aerial photograph of the ground beneath the aircraft and showing the instantaneous position of the aircraft and also showing the angle between said reference line and the longitudinal axis of the aircraft, continuously subtracting the varying drift angle indicated by the system under test from the varying angle beneath said fixed reference direction and the longitudinal axis of the aircraft, integrating with respect to time the angle so subtracted as the aircraft is flown over said reference line, taking third and fourth photographs simultaneously as the aircraft passes substantially over the end of said reference line, the third photograph being taken within the aircraft and showing the angle between the fixed reference direction maintained on the aircraft and the longitudinal axis of the aircraft, the fourth photograph being an aerial photograph of the ground beneath the aircraft and showing the instantaneous position of the aircraft and also showing the angle between said reference line and the longitudinal axis of the aircraft, recording the time elapsing during the flight from the beginning to the end of said reference line, combining the angles shown by said photographs to obtain the average angle between said reference line and said fixed reference direction on the aircraft, dividing the integrated angle by elapsed time and subtracting the result from said average angle to obtain a first approximation of the error, plotting the points representing the position of the aircraft at the beginning and end of said reference line, as shown by the second and fourth photographs, measuring the angle between a line joining said points and said reference line, and adding the result to said first approximation to obtain the true error.

14. The method of determining the error in the average drift angle measured by an aerial navigation system comprising the steps of selecting first and second reference lines spaced substantially apart on the surface of the earth and each of which is visible from the air, measuring the angles between each reference line and a first reference direction, measuring the angle between a line joining two points, one on each reference line, and said first reference direction, flying an aircraft containing the system under test so as to pass over said points on said lines successively, recording the values of first and second angles at the moment the aircraft passes over the point on said first reference line, the first angle being that between a second reference direction maintained on the aircraft and the longitudinal axis of the aircraft and the second angle being that between said first reference line on the ground and the longitudinal axis of the aircraft, continuously subtracting the varying drift angle indicated by the system under test from the varying angle between said second reference direction on the aircraft and the longitudinal axis of the aircraft, integrating with respect to time the angle so subtracted as the aircraft is flown between said two points, recording the values of third and fourth angles at the moment the aircraft passes over the point on said second reference line, said third angle being that between said second reference direction maintained on the aircraft and the longitudinal axis of the aircraft and the fourth angle being that between said second reference line on the ground and the longitudinal axis of the aircraft, recording the time elapsing during the flight between said two points, combining the first, second, third and fourth angles with the angles between each reference line and the first reference direction to obtain the average value of the angle between said first and second reference directions, dividing the integrated angle by elapsed time, and subtracting the sum of the integrated angle and the average angle between said first and second reference directions from the angle between the line joining the two points and the first reference direction to obtain the error.

References Cited in the file of this patent

UNITED STATES PATENTS

| | | |
|---|---|---|
| 2,378,182 | Burrell | June 12, 1945 |
| 2,705,319 | Dauber | Mar. 29, 1955 |
| 2,787,428 | Schuck | Apr. 2, 1957 |